United States Patent
Kanda et al.

(10) Patent No.: US 12,258,022 B2
(45) Date of Patent: Mar. 25, 2025

(54) VEHICLE CONTROL DEVICE, VEHICLE, AND VEHICLE CONTROL METHOD

(71) Applicant: TOYOTA JIDOSHA KABUSHIKI KAISHA, Toyota (JP)

(72) Inventors: Wataru Kanda, Nisshin (JP); Kazuki Miyake, Okazaki (JP); Shunsuke Arakawa, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 190 days.

(21) Appl. No.: 18/183,391

(22) Filed: Mar. 14, 2023

(65) Prior Publication Data

US 2024/0308524 A1    Sep. 19, 2024

(30) Foreign Application Priority Data

May 12, 2022   (JP) .................. 2022-078736

(51) Int. Cl.
*B60W 10/18*  (2012.01)
*B60W 30/18*  (2012.01)
*B60W 30/192* (2012.01)

(52) U.S. Cl.
CPC .......... *B60W 30/192* (2013.01); *B60W 10/18* (2013.01); *B60W 30/18009* (2013.01); *B60W 2720/106* (2013.01)

(58) Field of Classification Search
CPC ............... B60W 30/192; B60W 10/18; B60W 30/18009; B60W 2720/106; B60W 30/18027; B60W 30/18054; B60W 50/029; B60W 50/0098; B60W 2050/0094; B60W 30/12; B60W 30/16; B60W 2420/40; B60W 50/08; B60W 2520/105; B60Y 2300/18025
USPC ........................................... 701/99
See application file for complete search history.

(56) References Cited

U.S. PATENT DOCUMENTS

| 2012/0109411 A1* | 5/2012 | Tokimasa ............ B60W 10/184 701/1 |
| 2017/0217436 A1 | 8/2017 | Inomata |
| 2018/0134292 A1* | 5/2018 | Alpman .................. B60T 7/122 |
| 2020/0001878 A1* | 1/2020 | Tashiro ................. B60W 10/04 |
| 2020/0070849 A1* | 3/2020 | Suzuki ................ B60W 10/184 |

(Continued)

FOREIGN PATENT DOCUMENTS

| DE | 10 2020 211 965 A1 | 3/2022 |
| JP | 2008-001337 A | 1/2008 |

(Continued)

*Primary Examiner* — B M M Hannan
(74) *Attorney, Agent, or Firm* — Oliff PLC

(57) ABSTRACT

A vehicle control device includes a processor. The processor is configured to receive a first requested value of acceleration acting on a vehicle from a first system configured to request holding a stopped state of the vehicle. The processor is configured to receive a second requested value of the acceleration from a second system. The processor is configured to select one of the first requested value and the second requested value as an arbitration result. The processor is configured to set a priority for selecting the first requested value lower than a priority for selecting the second requested value when the processor acquires predetermined information from one of the first system and the second system while the vehicle is stopped.

6 Claims, 9 Drawing Sheets

(56) References Cited

U.S. PATENT DOCUMENTS

| | | | |
|---|---|---|---|
| 2021/0039630 A1* | 2/2021 | Oh | ........................ B60T 8/175 |
| 2021/0171062 A1 | 6/2021 | Hecker et al. | |
| 2022/0315018 A1 | 10/2022 | Miyake et al. | |

FOREIGN PATENT DOCUMENTS

| | | | |
|---|---|---|---|
| JP | 2012-144179 A | 8/2012 |
| JP | 2013-071472 A | 4/2013 |
| JP | 2020-032894 A | 3/2020 |
| JP | 2022-160174 A | 10/2022 |

\* cited by examiner

VEHICLE CONTROL DEVICE, VEHICLE, AND VEHICLE CONTROL METHOD

CROSS-REFERENCE TO RELATED APPLICATION

This application claims priority to Japanese Patent Application No. 2022-078736 filed on May 12, 2022, incorporated herein by reference in its entirety.

BACKGROUND

1. Technical Field

The present disclosure relates to a vehicle control device, a vehicle, and a vehicle control method that assist driving operations based on requests from a plurality of systems.

2. Description of Related Art

For example, there is a well-known vehicle capable of performing driving assistance with a driving assistance system including a plurality of systems such as a system for assisting a driver's driving operation and a system for performing autonomous driving. In such a vehicle, for example, when a requested acceleration is acquired from each of the systems, processing of selecting (arbitrating) the requested acceleration that satisfies a predetermined selection criterion (for example, the minimum value) from the plurality of requested accelerations is performed. The driving force of the vehicle is then calculated using the selected requested acceleration. Actuators such as the driving source of the vehicle and the braking device are controlled so as to generate the calculated driving force.

For example, Japanese Unexamined Patent Application Publication No. 2020-032894 (JP 2020-032894 A) discloses a technique for outputting instruction information for driving an actuator based on the result of arbitration by an arbitration unit. The arbitration unit arbitrates information representing longitudinal motion of the vehicle and information representing the lateral motion of the vehicle.

SUMMARY

In such a vehicle, for example, after the vehicle decelerates and stops due to the operation of the driving assistance system, the requested acceleration for performing control for maintaining the stopped state may be acquired from the system. The value acquired as the requested acceleration of the system may remain constant due to an abnormality in the system. As a result, when the vehicle is started by the operation of another system or when the vehicle is started by the driver's operation, even if the requested acceleration for starting is acquired, the requested acceleration for maintaining the stopped state may be selected based on a predetermined selection criterion. Therefore, the start of the vehicle may be delayed.

The present disclosure provides a vehicle control device, a vehicle, and a vehicle control method that suppress deterioration of the start responsiveness of a vehicle equipped with a plurality of systems for assisting driving.

A vehicle control device according to a first aspect of the present disclosure includes a processor. The processor is configured to receive a first requested value of acceleration acting on a vehicle from a first system configured to request holding a stopped state of the vehicle. The processor is configured to receive a second requested value of the acceleration from a second system. The processor is configured to select one of the first requested value and the second requested value as an arbitration result. The processor is configured to set a priority for selecting the first requested value lower than a priority for selecting the second requested value when the processor acquires predetermined information from one of the first system and the second system while the vehicle is stopped.

In this way, when the processor acquires the predetermined information, the priority for selecting the first requested value is set lower than that of the second requested value. Thus, the second requested value of the second system is preferentially selected as the arbitration result. Since the vehicle is suppressed from being held in a stopped state, it is possible to suppress deterioration of the start responsiveness of the vehicle.

In the vehicle control device according to the first aspect of the present disclosure, the processor may be configured to exclude the first requested value from a selection target when the processor acquires the predetermined information from one of the first system and the second system while the vehicle is stopped.

In this way, the first requested value is excluded from the selection target, so that the second requested value of the second system is selected as the arbitration result. Since the vehicle is suppressed from being held in a stopped state, it is possible to suppress deterioration of the start responsiveness of the vehicle.

In the vehicle control device according to the first aspect of the present disclosure, the processor may be configured to calculate a holding force for holding the stopped state of the vehicle, using a requested value selected as the arbitration result. The processor may be configured to acquire a requested acceleration calculated using the holding force as the first requested value when the first requested value is not input from the first system to the processor.

When the first requested value is not input from the first system, the requested acceleration calculated using the holding force may remain constant. In such a case, when the predetermined information is acquired, the priority for selecting the first requested value is lowered than that of the second requested value, which can suppress deterioration of the start responsiveness of the vehicle.

In the vehicle control device according to the first aspect of the present disclosure, the processor may be configured to set an upper limit value of an amount of change in the holding force for holding the stopped state of the vehicle when the processor acquires the predetermined information.

In this way, even when the holding force changes abruptly such as when receiving the start operation of the vehicle, the holding force can be suppressed from abruptly changing by setting the upper limit value. Therefore, the vehicle can be started smoothly.

A vehicle according to a second aspect of the present disclosure includes: a first system configured to output a first requested value of acceleration acting on the vehicle and request holding a stopped state of the vehicle; a second system configured to output a second requested value of the acceleration acting on the vehicle; and a control device. The control device is configured to control the vehicle using at least one of the first requested value and the second requested value, receive the first requested value, receive the second requested value, select one of the first requested value and the second requested value as an arbitration result, and set a priority for selecting the first requested value lower than a priority for selecting the second requested value when the control device acquires predetermined information from one of the first system and the second system while the vehicle is stopped.

A vehicle control method according to a third aspect of the present disclosure includes: receiving a first requested value of acceleration acting on a vehicle from a first system configured to request holding a stopped state of the vehicle; receiving a second requested value of the acceleration from a second system; selecting one of the first requested value and the second requested value as an arbitration result; and setting a priority for selecting the first requested value lower than a priority for selecting the second requested value when predetermined information from one of the first system and the second system is acquired while the vehicle is stopped.

A non-transitory storage medium according to a fourth aspect of the present disclosure stores instructions that are executable by one or more processors and that cause the one or more processors to perform the following functions. The functions include: receiving a first requested value of acceleration acting on a vehicle from a first system configured to request holding a stopped state of the vehicle; receiving a second requested value of the acceleration from a second system; selecting one of the first requested value and the second requested value as an arbitration result; and setting a priority for selecting the first requested value lower than a priority for selecting the second requested value when predetermined information from one of the first system and the second system is acquired while the vehicle is stopped.

The present disclosure can provide a vehicle control device, a vehicle, a vehicle control method, and a non-transitory storage medium that suppress deterioration of the start responsiveness of a vehicle equipped with a plurality of driving assistance systems.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
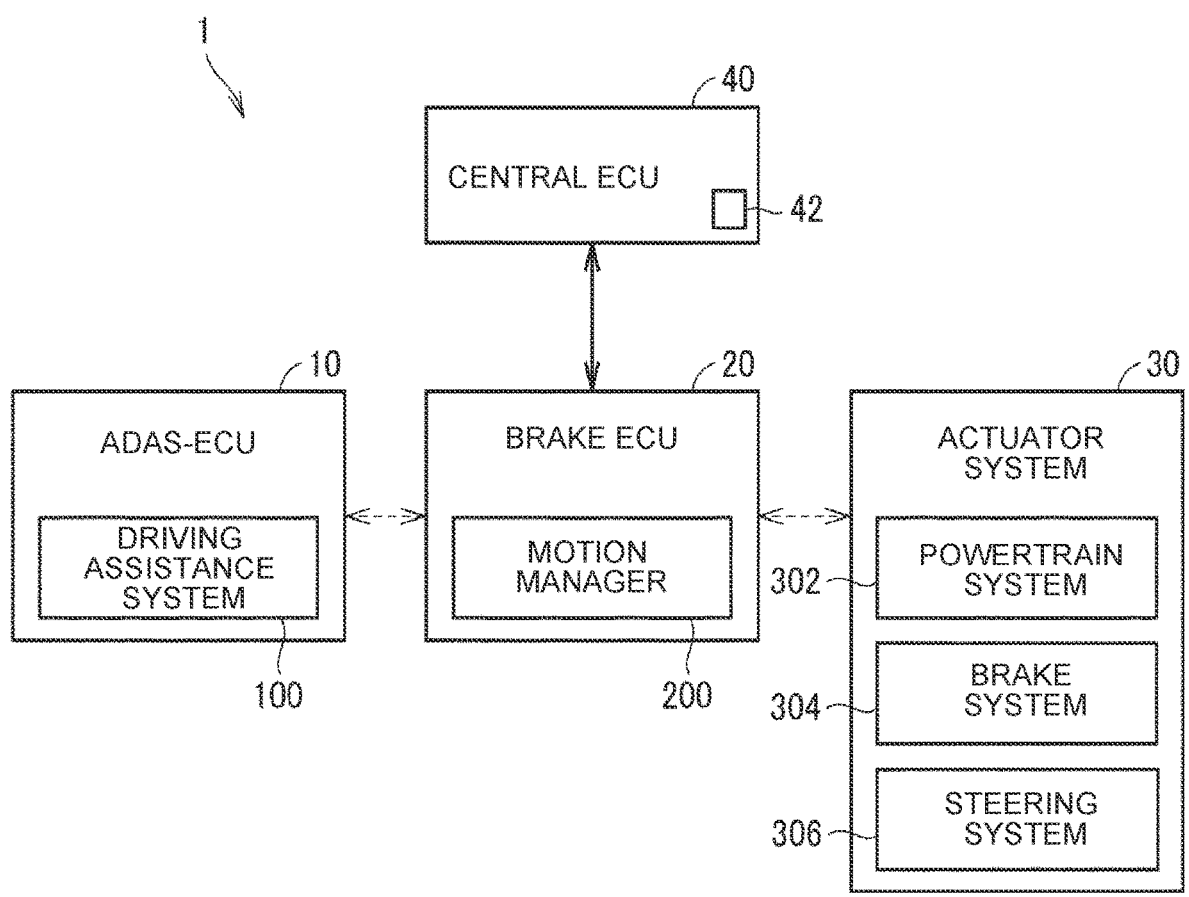
FIG. 1 is a diagram showing an example of a configuration of a vehicle.

Hereinafter, embodiments of the present disclosure will be described in detail with reference to the drawings. The same or corresponding parts in the drawings are denoted by the same reference signs, and the description thereof will not be repeated.

FIG. 1 is a diagram showing an example of a configuration of a vehicle 1. As shown in FIG. 1, the vehicle 1 includes an advanced driver assist system (ADAS)-electronic control unit (ECU) 10, a brake ECU 20, an actuator system 30, and a central ECU 40.

The vehicle 1 may be any vehicle having a configuration capable of realizing the functions of a driving assistance system, which will be described later. The vehicle 1 may be, for example, a vehicle using an engine as a drive source, a battery electric vehicle using an electric motor as a drive source, or a hybrid electric vehicle equipped with an engine and an electric motor and using at least one of the engine and the electric motor as a drive source.

The ADAS-ECU 10, the brake ECU 20 and the central ECU 40 are all computers having a processor such as a central processing unit (CPU) that executes a program, a memory, and an input/output interface.

The ADAS-ECU 10 includes a driving assistance system 100 having functions related to driving assistance of the vehicle 1. The driving assistance system 100 is configured to realize various functions for assisting driving of the vehicle 1 by executing implemented applications. Functions for assisting driving of the vehicle 1 include at least one of steering control, drive control, and braking control of the vehicle 1. Applications implemented in the driving assistance system 100 include, for example, an application that realizes the functions of an autonomous driving system (AD), an application that realizes the functions of an automatic parking system, and an application that realizes the functions of an advanced driver assist system (ADAS) (hereinafter referred to as ADAS application).

The ADAS application includes, for example, at least one of an application that realizes a follow-up traveling function for driving the vehicle while maintaining a distance with a preceding vehicle (adaptive cruise control (ACC), etc.), an application that realizes an auto-speed limiter (ASL) function that recognizes the vehicle speed limit and maintains the upper limit speed of the own vehicle, an application that realizes a lane keeping assistance function (lane keeping assist (LKA), lane tracing assist (LTA), etc.) that maintains the lane in which the vehicle is traveling, an application that realizes a collision damage mitigation braking function (autonomous emergency braking (AEB), pre-collision safety (PCS), etc.) that automatically applies braking to reduce collision damage, and an application that realizes a lane departure warning function (lane departure warning (LDW), lane departure alert (LDA), etc.) that warns that the vehicle 1 will deviate from the traveling lane.

Each application of the driving assistance system 100 outputs, to the brake ECU 20 (more specifically, a motion manager 200), a request for an action plan that secures the marketability (function) of the application alone, based on information on the situation of vehicle surroundings acquired (input) from a plurality of sensors (not shown), a driver's assistance request, and the like. The sensors include, for example, a vision sensor such as a front-facing camera, a radar, a light detection and ranging (LiDAR) sensor, or a position detection device.

The front-facing camera is disposed, for example, on the back side of the rear-view mirror inside the vehicle cabin. The front-facing camera is used to capture images ahead of the vehicle. The radar is a distance measurement device that irradiates an object with short-wavelength radio waves and detects the radio waves returned from the object to measure the distance and direction to the object. The LiDAR sensor is a distance measurement device that irradiates pulsed laser light beams (light beams such as infrared light beams) to measure the distance based on the time required for the light beams reflected from the object to return. The position detection device is constituted by, for example, a global positioning system (GPS). The GPS detects the position of the vehicle 1 using information received from a plurality of satellites orbiting the earth.

Each application acquires the information on the situation of vehicle surroundings obtained by integrating detection results of one or more sensors as recognition sensor information. Each application also acquires the driver's assistance request via a user interface (not shown) such as a switch. For example, each application can recognize other vehicles, obstacles, or people around the vehicle by performing image processing using artificial intelligence (AI) and image processing processors on images and videos of the surroundings of the vehicle acquired by multiple sensors.

The action plan includes, for example, a request regarding longitudinal acceleration/deceleration to be generated in the vehicle 1, a request regarding the steering angle of the vehicle 1, a request regarding holding the stopped state of the vehicle 1, and the like.

The request regarding the longitudinal acceleration/deceleration to be generated in the vehicle 1 includes, for example, an operation request for a powertrain system 302 and an operation request for a brake system 304. The request regarding the steering angle of the vehicle 1 includes, for example, an operation request for a steering wheel (not shown) and an operation request for an electric power steering device (not shown).

The request for holding the stopped state of the vehicle 1 includes, for example, a request for permitting or prohibiting operation of at least one of the electric parking brake and the parking lock mechanism (both not shown).

The electric parking brake limits rotation of a wheel of the vehicle 1 by operating an actuator, for example. The electric parking brake may be configured, for example, to limit the rotation of the wheel by operating a brake for a parking brake provided on at least one of the plurality of wheels provided on the vehicle 1, using an actuator. Alternatively, the electric parking brake may operate a parking brake actuator to adjust the hydraulic pressure supplied to the braking device of the brake system 304 (hereinafter sometimes referred to as brake hydraulic pressure). This activates the braking device and limits the rotation of the wheel. The braking device may brake a rotating wheel or hold the wheel in the stop state.

The parking lock mechanism restricts rotation of the output shaft of the transmission by operating the actuator. In the parking lock mechanism, for example, a protrusion provided at the tip of a parking lock pawl, of which the position is adjusted by an actuator, is fitted onto a teeth portion of a gear (lock gear) provided in connection with a rotating element in the transmission of the vehicle 1. This restricts the rotation of the output shaft of the transmission and restricts the rotation of the drive wheels.

The applications implemented in the driving assistance system 100 are not particularly limited to the applications described above. The driving assistance system 100 may implement applications that realize other functions, or existing applications may be omitted. The number of applications implemented in the driving assistance system 100 is not limited.

In the present embodiment, the ADAS-ECU 10 has been described as including the driving assistance system 100 constituted by a plurality of applications. However, for example, an ECU may be provided for each application. For example, the driving assistance system 100 may be constituted by an ECU that implements the application that realizes the functions of the autonomous driving system, an ECU that implements an application that realizes the functions of the automatic parking system, and an ECU that implements the ADAS application.

The brake ECU 20 includes the motion manager 200. In the present embodiment, a case where the brake ECU 20 has a hardware configuration including the motion manager 200 will be described as an example. The motion manager 200 may be provided as a single ECU separate from the brake ECU 20, or may be included in another ECU different from the brake ECU 20. The brake ECU 20 is configured to be able to communicate with each of the ADAS-ECU 10, various ECUs included in the actuator system 30, and the central ECU 40.

The motion manager 200 requests the actuator system 30 to operate the vehicle 1 based on the action plan set in at least one of the plurality of applications of the driving assistance system 100. A detailed configuration of the motion manager 200 will be described later.

The actuator system 30 is configured to realize operations of the vehicle 1 requested by the motion manager 200. The actuator system 30 includes a plurality of actuators. FIG. 1 shows a case where the actuator system 30 includes, for example, the powertrain system 302, the brake system 304, and a steering system 306 as actuators. It should be noted that the number of actuators that receives requests by the motion manager 200 is not limited to three as described above. The number of actuators may be four or more, or may be two or less.

The powertrain system 302 includes a powertrain capable of generating driving force to the drive wheels of the vehicle 1 and an ECU that controls the operation of the powertrain (both not shown). The powertrain includes, for example, at least one of an internal combustion engine such as a gasoline engine or a diesel engine, a transmission including a transmission device or a differential, a motor generator that serves as a drive source, a power storage device that stores electric power to be supplied to the motor generator, a power conversion device that mutually converts electric power between the motor generator and the power storage device, and a power generation source such as a fuel cell. An ECU for controlling the operation of the powertrain controls corresponding devices so as to achieve motion requests from the motion manager 200 to the corresponding devices in the powertrain system 302.

The brake system 304 includes, for example, a plurality of braking devices provided for each wheel of the vehicle 1. The braking device includes, for example, a hydraulic brake such as a disc brake that uses hydraulic pressure to generate braking force and holding force. The braking device may further include, for example, a motor generator that is connected to the wheels and generates regenerative torque. A braking operation of the vehicle 1 using the plurality of braking devices is controlled by the brake ECU 20. The brake ECU 20 is provided with, for example, a control unit (not shown) for controlling the brake system 304 separately from the motion manager 200.

The steering system 306 includes, for example, a steering device capable of changing the steering angle of steered wheels (for example, front wheels) of the vehicle 1 and an ECU that controls the operation of the steering device (both not shown). The steering device includes, for example, a steering wheel that changes the steering angle in accordance with the amount of operation, and an electric power steering (EPS) system that can adjust the steering angle by an actuator independently of the operation of the steering wheel. The ECU, which controls the operation of the steering device, controls the operation of the EPS actuator.

The central ECU 40 includes a memory 42 capable of updating stored contents. The central ECU 40 is, for example, configured to be able to communicate with the brake ECU 20, and is configured to be able to communicate with a device (e.g., a server) (not shown) outside the vehicle 1 via a communication module (not shown). When receiving update information from a server outside the vehicle 1, the central ECU 40 updates the information stored in the memory 42 using the received update information. Predetermined information is stored in the memory 42. The predetermined information includes, for example, information to be read from various ECUs when the system of the vehicle 1 is started.

In the present embodiment, the central ECU 40 has been described that the predetermined information is read from various ECUs when the system of the vehicle 1 is started. However, the central ECU 40 may have a function (gateway function) such as relaying communication between various ECUs.

Figure 2:
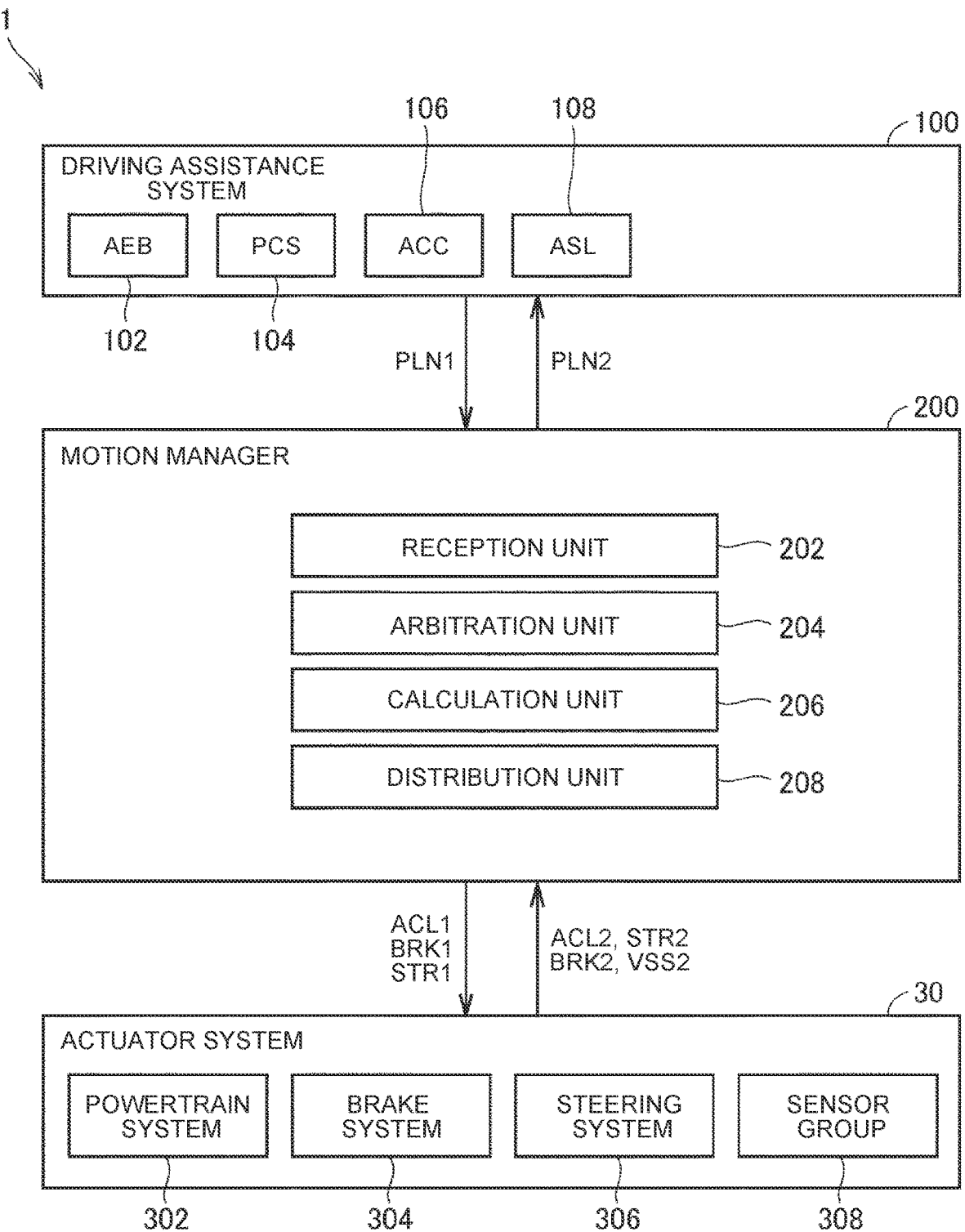
FIG. 2 is a diagram illustrating an example of an operation of a motion manager.

An example of the operation of the motion manager 200 will be described in detail below with reference to FIG. 2. FIG. 2 is a diagram illustrating an example of the operation of the motion manager 200.

FIG. 2 shows a case where the driving assistance system 100 includes, for example, an AEB 102, a PCS 104, an ACC 106, and an ASL 108 as applications. A request for an action plan set in at least one of the plurality of applications is transmitted from the driving assistance system 100 to the motion manager 200 as a request signal PLN1.

The request signal PLN1 includes, for example, information about the target acceleration set as one of the action plans in the ACC 106, the AEB 102, the PCS 104, or the ASL 108. The target acceleration includes an acceleration value for driving or braking the vehicle 1 as well as an acceleration value for holding the vehicle 1 in the stopped state.

The motion manager 200 sets the motion to be requested to the vehicle 1 based on the request for the action plan included in the received request signal PLN1. The motion manager 200 requests the actuator system 30 to realize the set motion. That is, the motion manager 200 transmits a request for operation of the powertrain system 302 to the actuator system 30 as a request signal ACL1. The motion manager 200 transmits a request for operation of the brake system 304 to the actuator system 30 as a request signal BRK1. In addition, the motion manager 200 transmits a request for operation of the steering system 306 to the actuator system 30 as a request signal STR1.

The request signal ACL1 includes, for example, information about the requested value of the driving torque or the driving force, information about the method of arbitration (for example, whether to select a maximum value or a minimum value, whether to change stepwise or gradually, etc.), and the like.

The request signal BRK1 includes, for example, information about the requested value of the braking torque, information about the method of arbitration (for example, whether to change stepwise or gradually), information about the timing of braking (to perform braking immediately or not), and the like.

The request signal STR1 includes, for example, the target steering angle, information about whether the target steering angle is valid, information about the upper and lower limit torques of the steering wheel operation assist torque, and the like.

The actuator that receives the corresponding request signal, among the plurality of actuators constituting the actuator system 30, is controlled so as to realize the request for the operation included in the request signal.

An example of the configuration of the motion manager 200 will be described below. As shown in FIG. 2, the motion manager 200 includes a reception unit 202, an arbitration unit 204, a calculation unit 206, and a distribution unit 208.

The reception unit 202 receives a request for an action plan output by one or more applications of the driving assistance system 100. Details of the action plan in the present embodiment will be described later.

The arbitration unit 204 arbitrates requests for a plurality of action plans received from each application via the reception unit 202. An example of this arbitration process is to select one action plan from a plurality of action plans based on a predetermined selection criterion. Another example of the arbitration process is to set a new action plan based on a plurality of action plans. Note that the arbitration unit 204 may further add predetermined information received from the actuator system 30 to arbitrate requests for a plurality of action plans. The arbitration unit 204 may further determine whether to temporarily prioritize the motion of the vehicle 1 determined according to the driver's state and the vehicle state over the motion of the vehicle 1 corresponding to the action plan determined based on the arbitration result.

The calculation unit 206 calculates a motion request based on the arbitration result of the requests for the action plans in the arbitration unit 204 and the motion of the vehicle 1 determined based on the arbitration result. This motion request is a physical quantity for controlling at least one actuator of the actuator system 30. The motion request includes physical quantities that are different from those of the requests for the action plans. For example, if the request for the action plan (first request) is longitudinal acceleration, the calculation unit 206 calculates a value obtained by converting the acceleration into the driving force or the driving torque as the motion request (second request). For example, when the target acceleration for holding the stopped state is selected as the arbitration result, the calculation unit 206 calculates the requested driving force corresponding to the target acceleration.

The distribution unit 208 executes a distribution process for distributing the motion request calculated by the calculation unit 206 to at least one actuator of the actuator system 30. For example, when acceleration of the vehicle 1 is requested, the distribution unit 208 distributes the motion request only to the powertrain system 302. Alternatively, when deceleration of the vehicle 1 is requested, the distribution unit 208 appropriately distributes the motion request to the powertrain system 302 and the brake system 304 to achieve the target deceleration.

For example, when the target acceleration for holding the stopped state is selected as the arbitration result, the distribution unit 208 determines the holding force (for example, brake hydraulic pressure) corresponding to the calculated driving force. In this case, the distribution unit 208 outputs the determined holding force to the brake system 304 as a motion request.

Information regarding the state of the powertrain system 302 is transmitted from the powertrain system 302 of the actuator system 30 to the motion manager 200 as a signal ACL2. The information regarding the state of the powertrain system 302 includes, for example, information about the operation of the accelerator pedal, information about the actual driving torque or the actual driving force of the powertrain system 302, information on the actual shift range, information on the upper and lower limits of the driving torque, information on the upper and lower limits of the driving force, information on the reliability of the powertrain system 302, and the like.

Information about the state of brake system 304 is transmitted from the brake system 304 of the actuator system 30 to the motion manager 200 as a signal BRK2. The information about the state of the brake system 304 includes, for example, information about the operation of the brake pedal, information about the braking torque requested by the driver, information about the requested value of the braking torque after the arbitration, information about the actual braking torque after the arbitration, information about the holding force after the arbitration, information about the reliability of the brake system 304, and the like.

Information regarding the state of the steering system 306 is transmitted from the steering system 306 of the actuator system 30 to the motion manager 200 as a signal STR2. Information regarding the state of the steering system 306 includes, for example, information about the reliability of the steering system 306, information on whether the driver is gripping the steering wheel, information about the torque for operating the steering wheel, information about the rotation angle of the steering wheel, and the like.

The actuator system 30 also includes a sensor group 308 in addition to the powertrain system 302, the brake system 304, and the steering system 306 described above.

The sensor group 308 includes a plurality of sensors that detects the behavior of the vehicle 1. The sensor group 308 includes, for example, a longitudinal G sensor that detects vehicle body acceleration in the longitudinal direction of the vehicle 1, a lateral G sensor that detects the vehicle body acceleration in the lateral direction of the vehicle 1, a wheel speed sensor provided on each wheel to detect the wheel speed, and a yaw rate sensor that detects the angular velocity of the rotation angle (yaw angle) in the yaw direction. The sensor group 308 transmits information including the detection results of the plurality of sensors to the motion manager 200 as a signal VSS2. That is, the signal VSS2 includes, for example, the values detected by the longitudinal G sensor, the values detected by the lateral G sensor, the values detected by the wheel speed sensor for each wheel, the values detected by the yaw rate sensor, and information about the reliability of each sensor.

When the motion manager 200 receives various signals from the actuator system 30, the motion manager 200 transmits predetermined information to the driving assistance system 100 as a signal PLN2.

The configurations of the devices mounted on the vehicle 1 and the configuration of the motion manager 200 described above are examples, and can be added, replaced, changed, omitted, etc. as appropriate. The functions of each device can be integrated into a single device or distributed across multiple devices as appropriate to be executed.

Furthermore, for example, when a requested value is not input from any one of the plurality of application systems that constitute the driving assistance system 100, the motion manager 200 calculates the requested value that is not input and inputs the value to the arbitration unit 204. A specific example will be described below.

For example, when the motion manager 200 cannot receive the requested acceleration due to a communication interruption with the PCS 104, the motion manager 200 calculates the holding force determined in the distribution unit 208 (for example, the holding force determined most recently) as the requested acceleration and inputs the value to the arbitration unit 204 as the requested acceleration from the PCS 104. The calculation of the requested acceleration using the holding force may be performed, for example, by a calculation processing unit (not shown). Alternatively, the calculation of the requested acceleration using the holding force may be performed by the distribution unit 208 or the arbitration unit 204. By doing so, it is possible to suppress the process of the arbitration unit 204 from being delayed due to a temporary communication interruption with the PCS 104. Moreover, it is possible to quickly perform an appropriate control operation after communication is restored.

In the vehicle 1 configured as described above, the motion manager 200 arbitrates among a plurality of requests for the action plans received from each application of the driving assistance system 100 based on a predetermined selection criterion, as described above.

As a specific example, the reception unit 202 of the motion manager 200 acquires, for example, a requested value of the acceleration acting in the longitudinal direction of the vehicle 1 from each application constituting the driving assistance system 100 (hereinafter referred to as a requested acceleration) as the action plan. The arbitration unit 204 of the motion manager 200 selects, for example, the minimum value among the acquired plurality of requested accelerations as a predetermined selection criterion. The calculation unit 206 of the motion manager 200 calculates the requested value of the driving force using the selected requested acceleration. The distribution unit 208 of the motion manager 200 distributes (outputs) the calculated requested value of the driving force to the corresponding actuators.

In such a vehicle 1, for example, after the vehicle 1 decelerates and stops due to executing any application system (hereinafter referred to as "application A") of the driving assistance system 100, the requested acceleration for performing the control for holding the stopped state may be acquired from the driving assistance system 100. Then, due to an abnormality such as a communication interruption between application A and the motion manager 200, the value acquired as the requested acceleration of application A may remain constant. As a result, when the vehicle is to be started by the operation of another application (hereinafter sometimes referred to as "application B") or when the vehicle is to be started by the driver's operation, even if the requested acceleration for starting is acquired, the requested acceleration for holding the stopped state may be selected based on a predetermined selection criterion, and the start of the vehicle 1 may be delayed. Application A is, for example, the PCS 104 or the like. Application B is, for example, the ACC 106 or the like.

Figure 3:
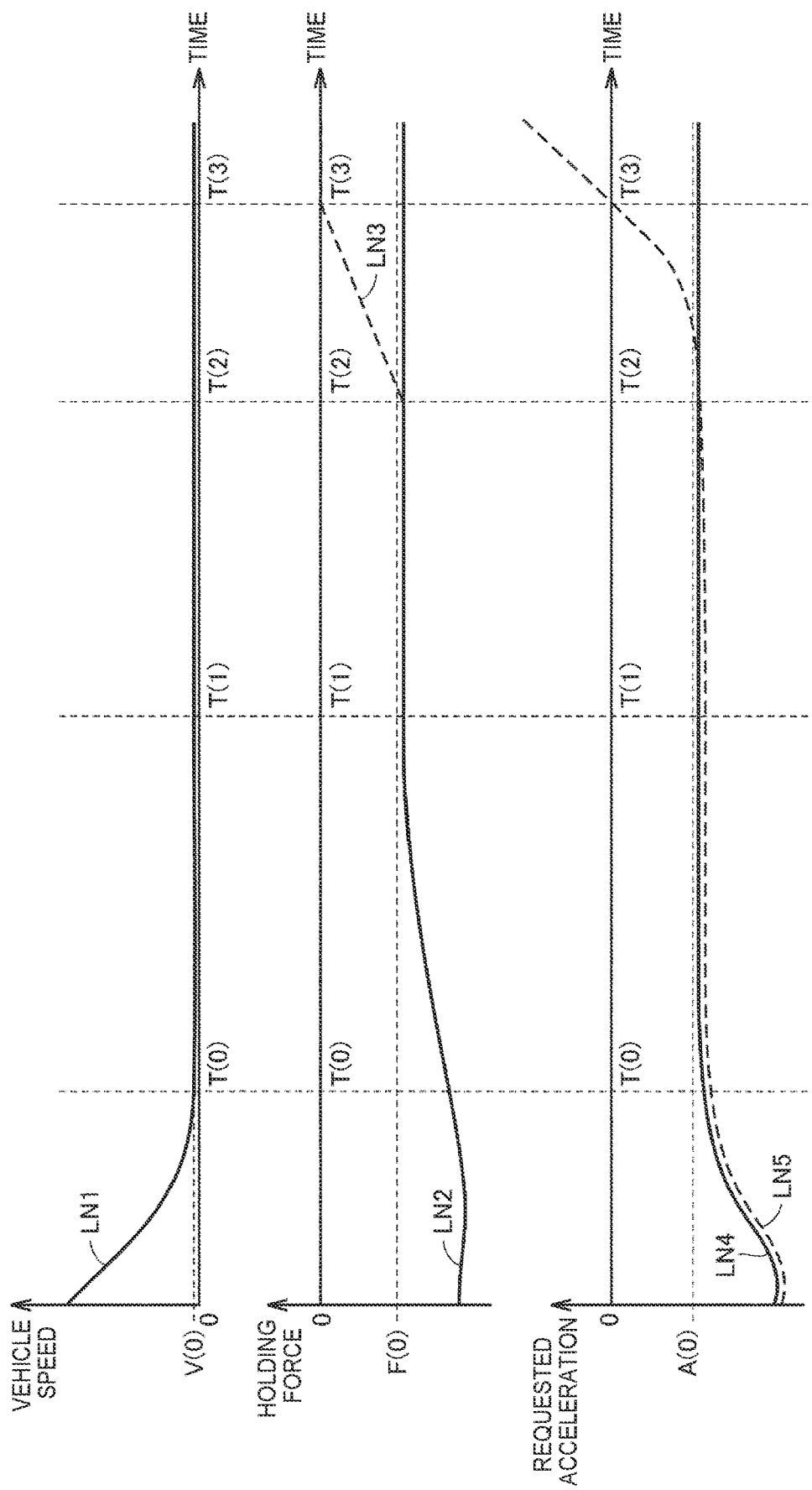
FIG. 3 is a diagram showing an example of an operation when the vehicle starts after stopping.

FIG. 3 is a diagram showing an example of an operation when the vehicle 1 starts after the vehicle 1 stops. The vertical axis in FIG. 3 indicates the speed of the vehicle (hereinafter also referred to as vehicle speed), the holding force (brake hydraulic pressure), and the requested acceleration. The horizontal axis in FIG. 3 indicates the time. LN1 in FIG. 3 indicates a change in the vehicle speed. LN2 (solid line) in FIG. 3 indicates a change in the holding force (pattern 1). LN3 (broken line) in FIG. 3 indicates the change in the holding force (pattern 2). LN4 in FIG. 3 indicates the change in the requested acceleration output by executing application A. LN5 in FIG. 3 indicates the change in the requested acceleration output by executing application B.

For example, it is assumed that the traveling vehicle 1 is decelerating as indicated by LN1 in FIG. 3 by executing applications A and B in the vehicle 1.

At time T(0), when the vehicle speed reaches a speed at which the vehicle is determined to be stopped, the requested accelerations (negative values) from applications A and B are input to the motion manager 200, as indicated by LN4 and LN5 in FIG. 3. The motion manager 200 uses the minimum value of the requested acceleration indicated by LN5 in FIG. 3 to calculate the holding force indicated by LN2 in FIG. 3. The braking device is controlled using the controller (brake ECU 20) of the brake system 304 so as to obtain the calculated holding force (brake hydraulic pressure). In FIG. 3, the holding force is indicated by a negative value, and the larger the absolute value is, the larger the holding force is (the higher the brake hydraulic pressure is).

Between time T(0) and time T(1), as indicated by LN2 in FIG. 3, the holding force converges to a value smaller than the holding force F(0) required for holding the stopped state by a predetermined value, and the stopped state of the vehicle 1 is held.

At this time, if the communication with application A is interrupted or the like, the requested acceleration is not input from application A. Therefore, the requested acceleration of application A is input to the arbitration unit 204 using the holding force.

As a result, at time T(2) after time T(1), even if the requested acceleration calculated by executing application B increases as indicated by LN5 in FIG. 3, when the requested acceleration of application A continues to be constant due to the communication interruption with application A, the holding force is maintained as indicated by LN2 in FIG. 3. Thus, unlike the change indicated by LN3 in FIG. 3, the holding force does not change in accordance with the increase in the requested acceleration of LN5 in FIG. 3. That is, the vehicle 1 is held to a stopped state even at time T(3) and after, which may delay the start of the vehicle 1. The pattern in which the holding force is maintained as indicated by LN2 in FIG. 3 even if the requested acceleration calculated by executing application B increases as indicated by LN5 in FIG. 3 is regarded as pattern 1. The pattern in which the holding force changes as indicated by LN3 in FIG. 3 in accordance with the increase in the requested acceleration calculated by executing application B is regarded as pattern 2.

In view of this, in the present embodiment, when the arbitration unit 204 acquires predetermined information from any one of the plurality of systems while the vehicle 1 is stopped, the arbitration unit 204 lowers the priority of selecting a first requested value than that of selecting other requested values. In the present embodiment, when the arbitration unit 204 acquires predetermined information from application B of which communication is not interrupted while the vehicle 1 is stopped, the arbitration unit 204 excludes the first requested acceleration of application A from the selection target.

In this way, a requested acceleration other than the requested acceleration of application A is selected as the arbitration result. Therefore, the vehicle 1 is suppressed from being held in a stopped state. It is also possible to suppress the deterioration of the start responsiveness of the vehicle 1 and suppress the delay of the start of the vehicle 1.

Figure 4:
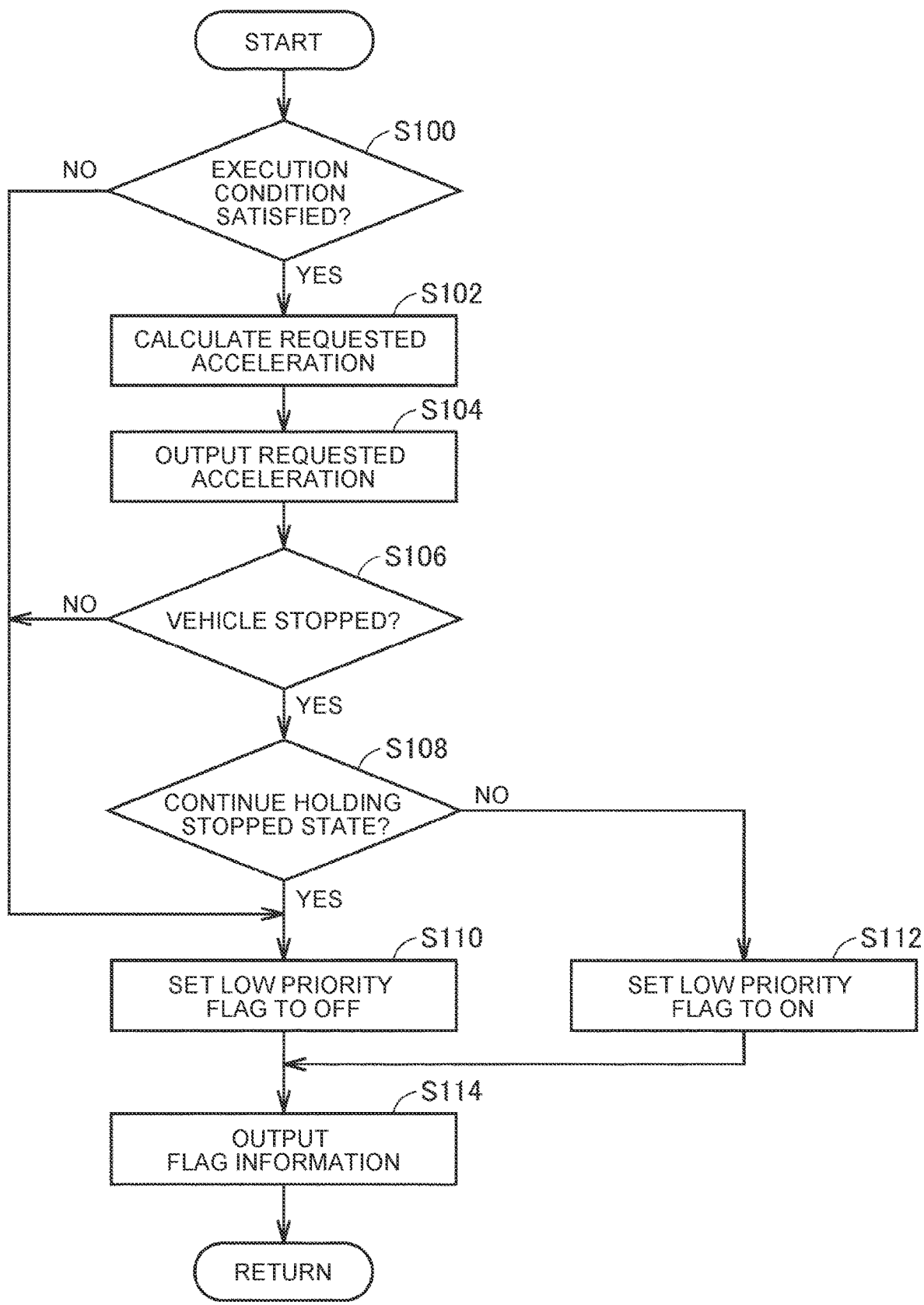
FIG. 4 is a flowchart showing an example of processes executed by an application B.

Processes executed by application B of the driving assistance system 100 will be described below with reference to FIG. 4. FIG. 4 is a flowchart showing an example of processes executed by application B. A series of processes shown in this flowchart is repeatedly executed by application B at predetermined control cycles. A program constituting application B is specifically executed by the CPU of the ADAS-ECU 10. Thus, in the following description, it is assumed that the ADAS-ECU 10 executes the processes.

In step S100, the ADAS-ECU 10 determines whether an execution condition is satisfied. The execution condition includes, for example, a condition that an operation for executing application B has been received by the user and application B is in an executable state. When it is determined that the execution condition is satisfied (YES in step S100), the process proceeds to step S102.

In step S102, the ADAS-ECU 10 calculates the requested acceleration. For example, when the application B is the ACC 106, the ADAS-ECU 10 calculates an acceleration that allows following the preceding vehicle while maintaining a predetermined distance from the preceding vehicle, as the requested acceleration. For example, when the preceding vehicle is stopped, the ADAS-ECU 10 calculates the requested acceleration so that the vehicle 1 stops. After that, the process proceeds to step S104.

In step S104, the ADAS-ECU 10 outputs the calculated requested acceleration to the motion manager 200.

In step S106, the ADAS-ECU 10 determines whether the vehicle 1 is stopped. The ADAS-ECU 10 determines that the vehicle 1 is stopped when the speed of the vehicle 1 is equal to or less than a threshold value. The ADAS-ECU 10 may, for example, acquire the speed of the vehicle 1 using the sensor group 308, or may acquire the speed of the vehicle 1 using another detection device. When it is determined that the vehicle 1 is stopped (YES in step S106), the process proceeds to step S108.

In step S108, the ADAS-ECU 10 determines whether to continue holding the stopped state. For example, the ADAS-ECU 10 determines to continue holding the stopped state when the elapsed time of the state where the magnitude of the amount of change in the holding force (brake hydraulic pressure) per unit time is equal to or less than a threshold value is within a predetermined time. On the other hand, when the elapsed time exceeds the predetermined time, the ADAS-ECU 10 determines not to continue holding the stopped state. The ADAS-ECU 10 may, for example, acquire the holding force using the sensor group 308, or may acquire the holding force using another detection device. When it is determined to continue holding the stopped state (YES in step S108), the process proceeds to step S110.

In step S110, the ADAS-ECU 10 sets the low priority flag of application A to OFF. The low priority flag indicates whether to lower the priority of the requested acceleration calculated by executing application A. When the low priority flag is OFF, the priority of the requested acceleration calculated by executing application A is not lowered. In this case, the arbitration unit 204 selects the requested acceleration among the above requested acceleration and the requested accelerations of other systems, based on a predetermined selection criterion. After that, the process proceeds to step S114. When it is determined not to continue holding the stopped state (NO in step S108), the process proceeds to step S112.

In step S112, the ADAS-ECU 10 sets the low priority flag of application A to ON. When the low priority flag is ON, the priority of the requested acceleration calculated by executing application A is lowered. In this case, the arbitration unit 204 excludes the above requested acceleration from the selection target, and selects the requested acceleration among the requested accelerations of the other systems based on a predetermined selection criterion. After that, the process proceeds to step S114.

In step S114, the ADAS-ECU 10 outputs flag information to the motion manager 200. The ADAS-ECU 10 outputs either information indicating that the low priority flag is ON or information indicating that the low priority flag is OFF to the motion manager 200 as the flag information.

Figure 5:
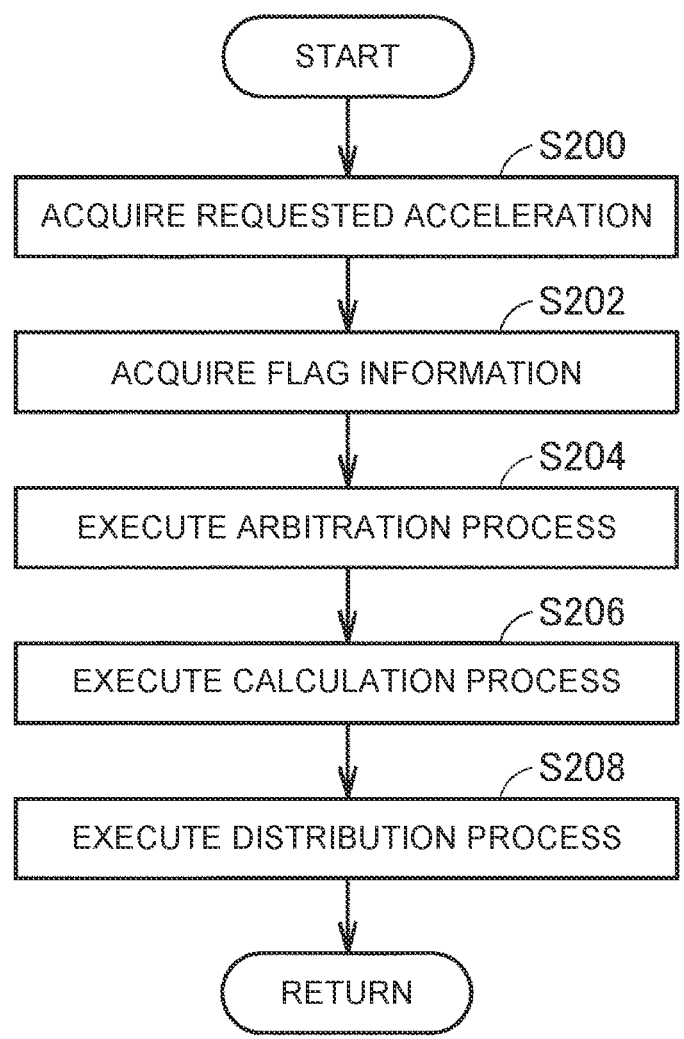
FIG. 5 is a flowchart showing an example of processes executed in the motion manager.

The processes executed in the motion manager 200 will now be described with reference to FIG. 5. FIG. 5 is a flowchart showing an example of the processes executed in the motion manager 200. FIG. 5 shows an example of processes for arbitrating the requested acceleration in the longitudinal direction of the vehicle 1 and determining the holding force.

In step S200, the motion manager 200 (specifically, the reception unit 202) acquires the requested acceleration from each application. The motion manager 200 acquires the requested acceleration from the application that calculates the requested acceleration in the longitudinal direction of the vehicle 1 among a plurality of applications including application B described above.

In step S202, the motion manager 200 acquires the flag information input from application B (ADAS-ECU 10).

In step S204, the motion manager 200 (specifically, the arbitration unit 204) executes the arbitration process. Specifically, when the flag information includes information indicating that the low priority flag is OFF, the motion manager 200 selects the minimum value among all the acquired requested accelerations as the final requested acceleration. Further, when the flag information includes information indicating that the low priority flag of application A is ON, the motion manager 200 (specifically, the arbitration unit 204) excludes the requested acceleration calculated by executing application A from the selection target. The motion manager 200 then selects the minimum value among the requested accelerations other than application A as the final requested acceleration.

In step S206, the motion manager 200 (specifically, the calculation unit 206) executes the calculation process. That is, the motion manager 200 calculates the requested driving force using the selected requested acceleration. The method of calculating the requested driving force by the calculation unit 206 is as described above, and therefore detailed description thereof will not be repeated.

In step S208, the motion manager 200 (specifically, the distribution unit 208) executes the distribution process. Since the distribution process is as described above, detailed description thereof will not be repeated.

Figure 6:
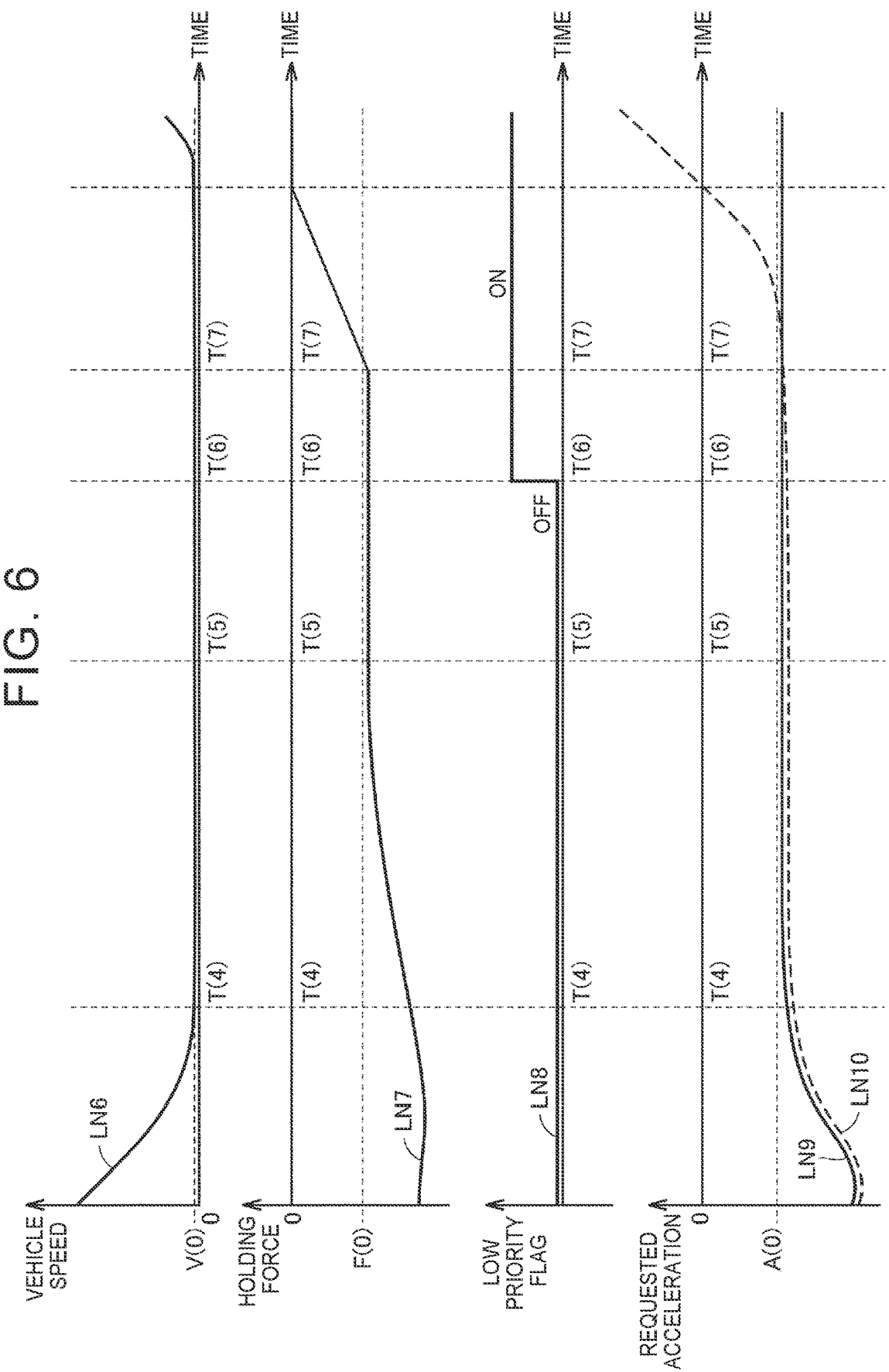
FIG. 6 is a diagram showing an example of an operation of the motion manager.

An example of the operation of the vehicle 1 based on the above structure and flowchart will be described with reference to FIG. 6. FIG. 6 is a diagram showing an example of the operation of the motion manager 200. The vertical axis in FIG. 6 indicates the vehicle speed, the holding force, the state of the low priority flag, and the requested acceleration. The horizontal axis in FIG. 6 indicates the time. LN6 in FIG. 6 indicates an example of a temporal change in the vehicle speed. LN7 in FIG. 6 indicates an example of a temporal change in the holding force. LN8 in FIG. 6 indicates an example of a temporal change in the state of the low priority flag. LN9 in FIG. 6 indicates an example of a temporal change in the requested acceleration calculated by executing application A. LN10 in FIG. 6 indicates an example of a temporal change in the requested acceleration calculated by executing application B.

For example, it is assumed that the vehicle 1 is decelerating as indicated by LN6 in FIG. 6 by executing applications A and B in the vehicle 1. At this time, when it is determined that the execution condition is satisfied by executing application B by the ADAS-ECU 10 (YES in step S100), the requested acceleration is calculated (step S102), and the calculated requested acceleration is output to the motion manager 200 (step S104). When the vehicle 1 is not stopped (NO in step S106), the low priority flag is set to OFF (step S110), and the flag information indicating that the low priority flag is OFF is output to the motion manager 200 (step S114).

The motion manager 200 acquires the requested acceleration from each application (step S200) and acquires the flag information from application B (step S202). The low priority flag is OFF. Therefore, the motion manager 200 executes the arbitration process using a plurality of requested accelerations including the requested acceleration calculated by executing application A, and selects the final requested acceleration (step S204). The motion manager 200 calculates the requested driving force using the selected requested acceleration (step S206). Then, the distribution process is executed using the calculated requested driving force to determine the holding force (step S208). The brake hydraulic pressure is controlled to operate the braking device included in the brake system 304 such that the determined holding force is generated.

In this case, the holding force acts on the vehicle 1 as a braking force while the vehicle 1 is traveling, and the vehicle speed decreases. As the vehicle speed approaches zero, as shown by LN9 and LN10 in FIG. 6, the magnitude (the absolute value) of the requested acceleration calculated by executing applications A and B decreases.

At time T(4), as indicated by LN6 in FIG. 6, after the vehicle speed becomes equal to or lower than the speed V(0) at which the vehicle is determined to be stopped, when the execution condition is satisfied (YES in step S100), the requested acceleration (negative value) is calculated (step S102), and the calculated requested acceleration is output to the motion manager 200 (step S104). When the vehicle 1 is stopped (YES in step S106) and it is determined to continue holding the stopped state (YES in step S108), the low priority flag is kept OFF (step S110). The flag information is output from the ADAS-ECU 10 to the motion manager 200 (step S114).

As described above, the motion manager 200 acquires the requested acceleration from each application (step S200) and acquires the flag information from application B (step S202). The low priority flag is OFF. Therefore, the motion manager 200 executes the arbitration process using a plurality of requested accelerations including the requested acceleration from application A, and selects the final requested acceleration (step S204). The motion manager 200 executes the calculation process to calculate the requested driving force (step S206). Then, the motion manager 200 executes the distribution process using the calculated requested driving force to determine the holding force (step S208).

At time T(5), as indicated by LN7 in FIG. 6, the magnitude of the amount of change in the holding force becomes equal to or less than the threshold value. Then, at time T(6), when the state in which the magnitude of the amount of change in the holding force is equal to or less than the threshold value continues for a period of time exceeding a predetermined time, it is determined not to continue holding the stopped state (NO in step S108). The low priority flag becomes ON (step S112). Therefore, the flag information indicating that the low priority flag is ON is output to the motion manager 200 (step S114).

The motion manager 200 acquires the requested acceleration from each application (step S200) and acquires the flag information from application B (step S202). The low priority flag is ON. Therefore, the motion manager 200 executes the arbitration process using a plurality of requested accelerations excluding the requested acceleration calculated by executing application A, and selects the final requested acceleration (step S204). The motion manager 200 executes the calculation process to calculate the requested driving force (step S206). Then, the motion manager 200 executes the distribution process using the calculated requested driving force (step S208) to determine the holding force.

From time T(6) to time T(7), the requested acceleration selected as the arbitration result is A(0) or less, so the holding force continues to be F(0) or less.

At time T(7), as the requested acceleration increases toward zero due to the operation of application B, the holding force also changes (increases) toward zero. After the holding force becomes zero, the state of zero holding force continues. When the requested acceleration becomes greater than zero, the vehicle 1 is not braked by the holding force, and the driving force acts on the vehicle 1 to start the vehicle 1.

As described above, with the motion manager 200, which is the vehicle control device, according to the present embodiment, when the flag information indicating that the low priority flag of application A is ON is acquired from application B, the requested acceleration of application A is excluded from the selection target, and the requested acceleration of another application is selected as the arbitration result. Therefore, the vehicle 1 is suppressed from being held in a stopped state. This makes it possible to suppress the deterioration of the start responsiveness of the vehicle 1. Therefore, it is possible to provide a vehicle control device, a vehicle, a vehicle control method, and a non-transitory storage medium for suppressing deterioration of the start responsiveness of a vehicle equipped with a driving assistance system.

Furthermore, with the operation of application A, the flag information indicating that the low priority flag is ON is output when the state where the magnitude of the amount of change in the holding force is equal to or less than the threshold value continues for a period of time exceeding a predetermined time while the vehicle is stopped. That is, the flag information is output when the holding force in the stopped state converges. The requested acceleration of another application is then selected as the arbitration result. Therefore, since the vehicle 1 is suppressed from being held in a stopped state, it is possible to suppress deterioration of the start responsiveness of the vehicle 1.

A modification will be described below.
In the above-described embodiment, a configuration where the motion manager 200 includes the reception unit 202, the arbitration unit 204, the calculation unit 206, and the distribution unit 208 has been described as an example. However, the motion manager 200 may include, for example, a first motion manager that receives action plans from applications, and a second motion manager that can communicate with the first motion manager and requests motion to the actuator system 30. In this case, the function of the arbitration unit 204, the function of the calculation unit 206, and the function of the distribution unit 208 may be implemented in either the first motion manager or the second motion manager.

Further, in the above-described embodiment, it has been described that, when the motion manager 200 acquires the low priority flag information of application A from application B while the vehicle is stopped, the requested acceleration calculated by executing application A is excluded from the selection target to obtain the arbitration result. However, for example, the priority of the requested acceleration calculated by executing application A may be lowered than that of the requested acceleration calculated by executing other applications. For example, when the reception unit 202 has received a plurality of requested accelerations including the requested acceleration calculated by executing application A, the arbitration unit 204 selects a final requested acceleration from the plurality of requested accelerations excluding the requested acceleration calculated by executing application A, based on a predetermined selection criterion. On the other hand, when the reception unit 202 has received only the requested acceleration calculated by executing application A, the arbitration unit 204 may select the above requested acceleration as the final requested acceleration. In this way, when the flag information indicating that the low priority flag of application A is ON is acquired from application B, the priority for selecting the requested acceleration calculated by executing application A is lowered than that of the other requested values. Therefore, the requested accelerations calculated by executing the other applications are preferentially selected as the arbitration result. Since the vehicle 1 is suppressed from being held in a stopped state, it is possible to suppress deterioration of the start responsiveness of the vehicle 1.

Furthermore, in the above-described embodiment, it has been described that, when the motion manager 200 acquires the low priority flag information from application B while the vehicle is stopped, the requested acceleration calculated by executing application A is excluded from the selection target to obtain the arbitration result. However, the state of the low priority flag may be set by an application other than application B among the plurality of application systems. The state of the low priority flag may be set by a program stored in the ADAS-ECU 10.

Furthermore, in the above-described embodiment, it has been described that, it is determined not to continue holding the stopped state when the state where the magnitude of the amount of change in the holding force is equal to or less than the threshold value continues for a predetermined time while the vehicle is stopped. However, for example, in the case where it is determined that the communication from application A has been interrupted, it may be determined not to continue holding the stopped state when a predetermined time elapses after the vehicle 1 has stopped.

Furthermore, in the above-described embodiment, it has been described that, it is determined not to continue holding the stopped state when the state where the magnitude of the amount of change in the holding force is equal to or less than the threshold value continues for a predetermined time while the vehicle is stopped. However, for example, in the case where the user has performed a start operation, it may be determined not to continue holding the stopped state since there is an intention to start the vehicle 1. Alternatively, it may be determined not to continue holding the stopped state when the vehicle is shifted to the fixed state or released from the fixed state by the operation of the user or the application. The fixed state of the vehicle includes, for example, at least one of a state in which the parking brake is operating and a state in which the shift position is the parking position. Furthermore, it may be determined not to continue holding the stopped state when the user performs a brake operation (for example, a brake release operation).

Furthermore, in the above-described embodiment, it has been described that, the motion manager 200 acquires the flag information to exclude the requested acceleration calculated by executing application A while the vehicle is stopped from the selection target, and obtains the arbitration result to suppress deterioration of the start responsiveness of the vehicle 1. However, when the flag information is acquired and the user performs the start operation of the vehicle 1, an upper limit value may be set for the magnitude of the amount of change in the holding force.

Figure 7:
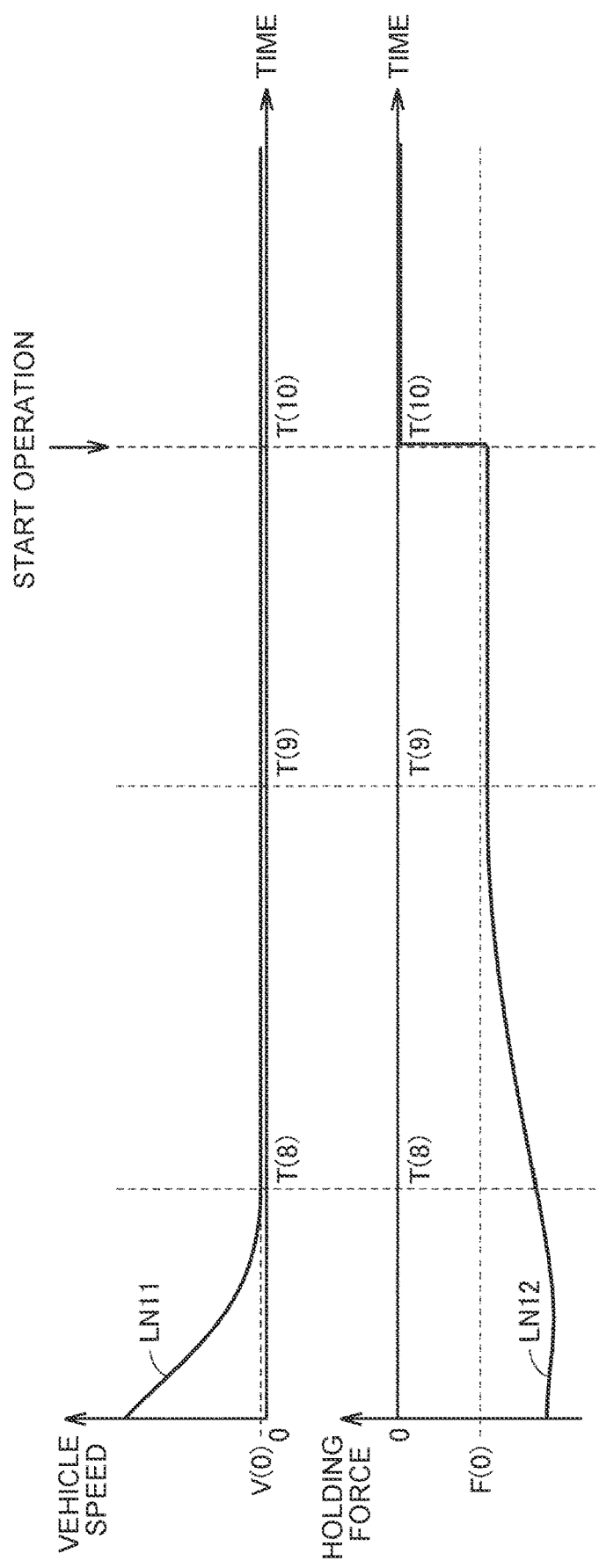
FIG. 7 is a diagram showing a comparative example of a change in holding force during a start operation.

FIG. 7 is a diagram showing a comparative example of a change in the holding force during the start operation. The vertical axis in FIG. 7 indicates the vehicle speed and the holding force. The horizontal axis in FIG. 7 indicates the time. LN11 in FIG. 7 indicates a change in the vehicle speed. LN12 in FIG. 7 indicates a change in the holding force.

The operation of the vehicle 1 during the periods up to time T(8), from time T(8) to time T(9), and from time T(9) to time T(10) in FIG. 7 is the same as the operation of the vehicle 1 up to time T(4), from time T(4) to time T(5), and from time T(5) to time T(6) in FIG. 6, respectively. Therefore, detailed description thereof will not be repeated.

At time T(10), when the low priority flag becomes ON and the user performs a start operation, as indicated by LN12 in FIG. 7, the holding force changes abruptly to zero at time T(10). Accordingly, the holding force is suddenly lost, the driving force suddenly acts, or the like and generates vibration in the vehicle 1, which may hinder the vehicle 1 from starting smoothly.

In view of this, when the flag information is acquired and the user performs the start operation of the vehicle 1, the motion manager 200 may set an upper limit value for the magnitude of the amount of change in the holding force.

Figure 8:
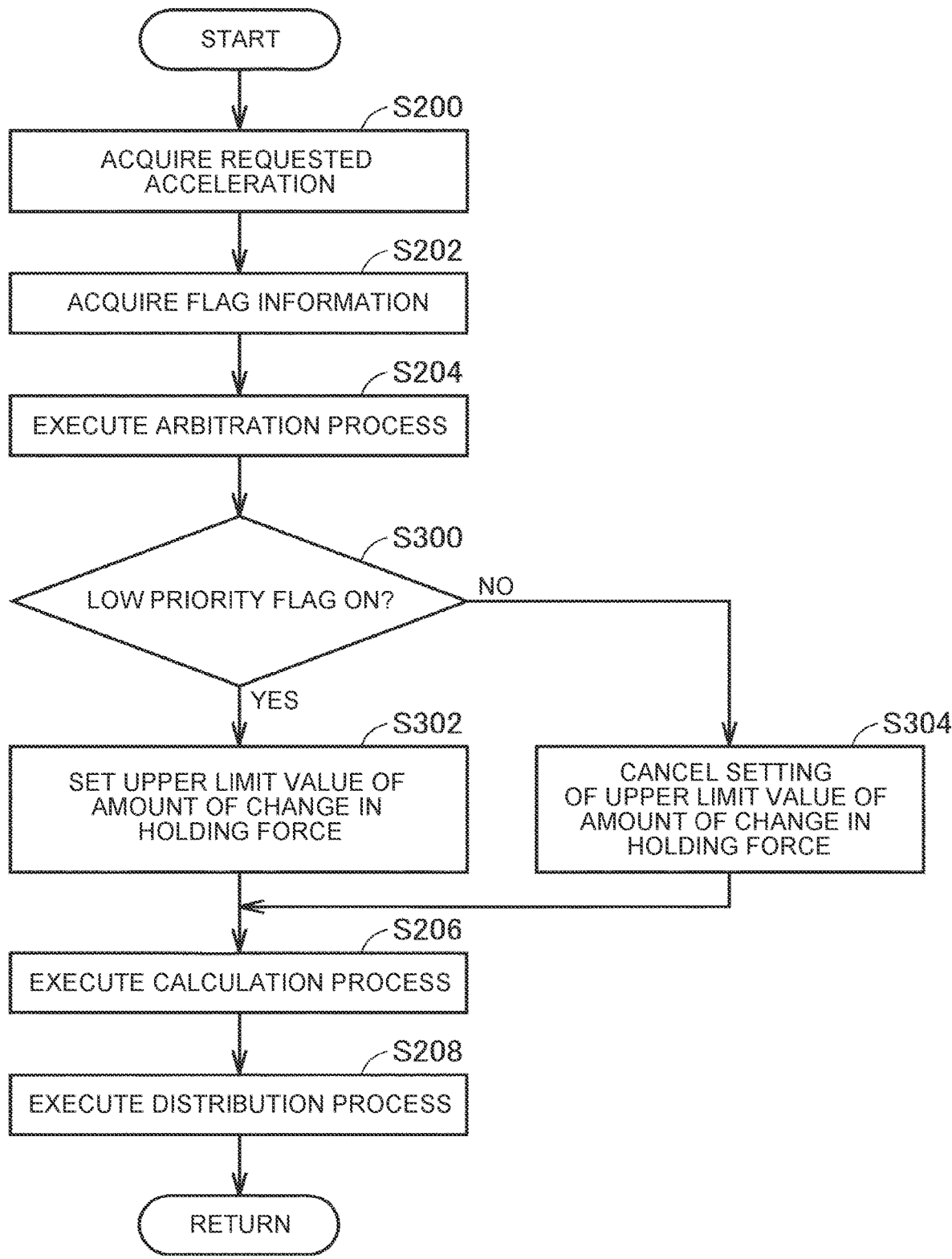
FIG. 8 is a flowchart showing an example of processes executed in a motion manager according to a modification.

Processes executed in the motion manager 200 in this modification will be described below with reference to FIG. 8. FIG. 8 is a flowchart showing an example of processes executed in the motion manager 200 according to the modification. A series of processes shown in this flowchart is repeatedly executed by the motion manager 200 at predetermined control cycles.

Note that the processes of steps S200, S202, S204, S206, and S208 in the flowchart in FIG. 8 are the same as the processes of steps S200, S202, S204, S206, and S208 in the flowchart in FIG. 5, except for the cases described below. Therefore, detailed description thereof will not be repeated.

After the arbitration process is executed (step S204), the process proceeds to step S300. In step S300, the motion manager 200 determines whether the low priority flag is ON. When it is determined that the low priority flag is ON (YES in step S300), the process proceeds to step S302.

In step S302, the motion manager 200 sets the upper limit value of the amount of change in the holding force. The upper limit value of the amount of change in the holding force may be set based on, for example, the amount of operation of the accelerator pedal or the brake pedal by the user, the rate of change of these operation amounts, etc., or may be a predetermined value. The upper limit value is set so that a predetermined vibration (for example, resonance or the like) does not occur when the vehicle 1 starts moving. After that, the process proceeds to step S206. When it is determined that the low priority flag is OFF (NO in step S300), the process proceeds to step S304.

In step S304, the motion manager 200 cancels the setting of the upper limit value of the amount of change in the holding force. The motion manager 200 may disable the setting of the upper limit value of the amount of change in the holding force, or may set the upper limit value to an initial value. The initial value is a predetermined value larger than the upper limit value set in step S302, and is a value that allows a stepwise change in the holding force. Note that the motion manager 200 maintains the canceled state when the setting of the upper limit value of the amount of change in the holding force is canceled. After that, the process proceeds to step S206.

Figure 9:
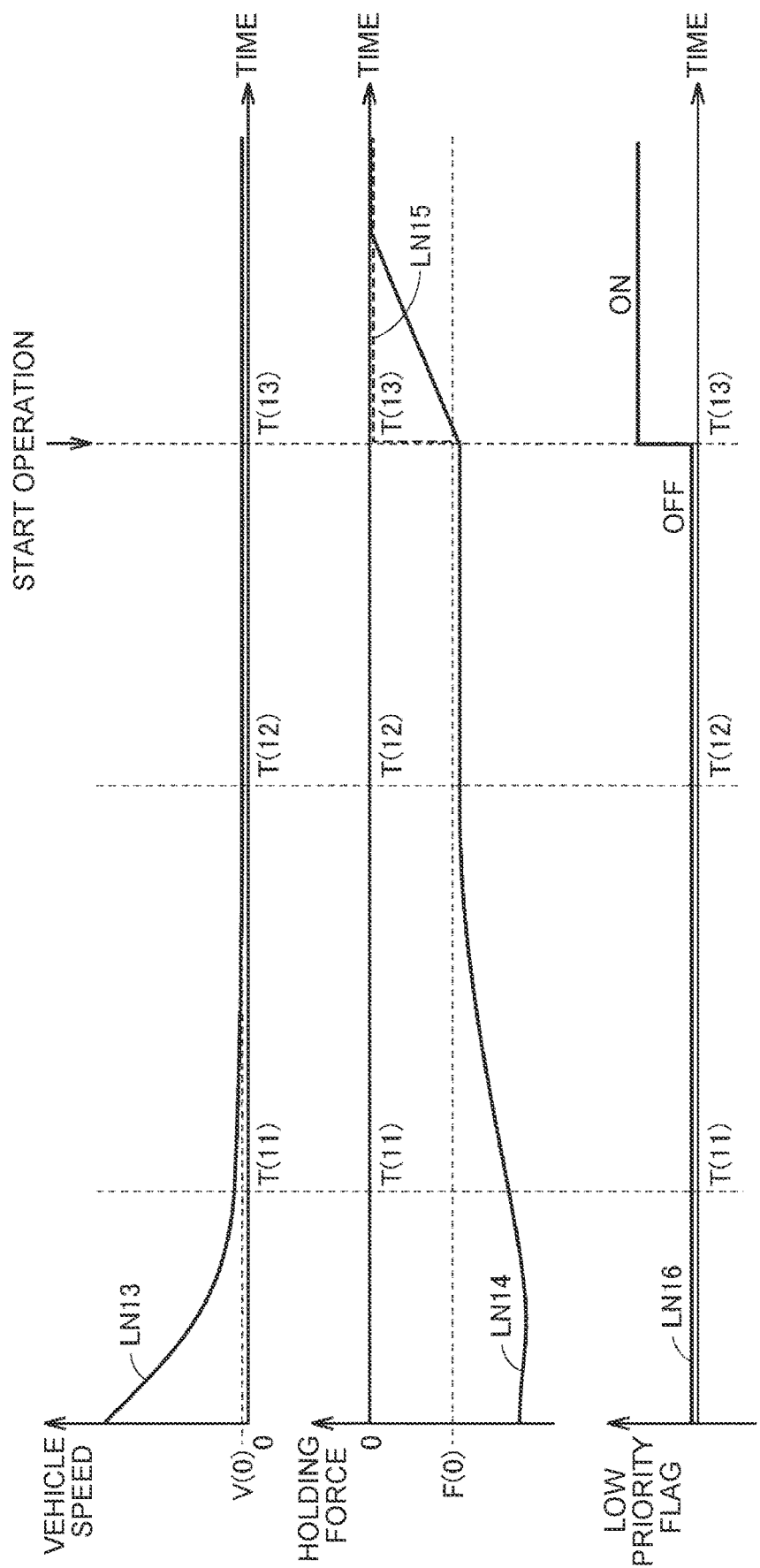
FIG. 9 is a diagram showing an example of an operation of the motion manager according to the modification.

An example of the operation of the vehicle 1 in the present modification based on the above structure and flowchart will be described with reference to FIG. 9. FIG. 9 is a diagram showing an example of an operation of the motion manager 200 according to the modification. The vertical axis in FIG. 9 indicates the vehicle speed, the holding force, and the state of the low priority flag. The horizontal axis in FIG. 9 indicates the time. LN13 in FIG. 9 indicates a change in the vehicle speed. LN14 in FIG. 9 indicates a change in the holding force. LN15 in FIG. 9 indicates a change in the state of the low priority flag.

The operation of the vehicle 1 during the periods up to time T(11), from time T(11) to time T(12), and from time T(12) to time T(13) is the same as the operation of the vehicle 1 up to time T(4), from time T(4) to time T(5), and from time T(5) to time T(6) in FIG. 6, respectively. Therefore, detailed description thereof will not be repeated.

At time T(13), when the state where the magnitude of the amount of change in the holding force is equal to or less than the threshold value continues for a predetermined time, it is determined not to continue holding the stopped state (NO in step S108). As indicated by LN16 in FIG. 9, the low priority flag becomes ON (step S112). Therefore, the flag information indicating that the low priority flag is ON is output to the motion manager 200 (step S114).

The motion manager 200 acquires the requested acceleration from each application (step S200) and acquires the flag information from application B (step S202). Since the low priority flag is ON, the motion manager 200 excludes the requested acceleration calculated by executing application A to execute the arbitration process and selects the final requested acceleration (step S204). Since the low priority flag is ON (YES in step S300), the upper limit value of the amount of change in the holding force is set (step S302).

Thus, even when the user performs a start operation such as depressing the accelerator pedal, the holding force approaches zero at a constant rate of change from time T(13), as indicated by L14 in FIG. 9. Therefore, compared to the case where the holding force is suddenly lost as shown in LN15 in FIG. 9, the occurrence of vibration caused by an increase in the driving force, a sudden decrease in the holding force, or the like, due to the start operation, is suppressed, which enables the vehicle 1 to be started smoothly.

In this manner, when the flag information indicating that the low priority flag is ON is acquired from application B, the upper limit value of the amount of change in the holding force is set. As a result, the vehicle 1 can be started smoothly when the start operation of the vehicle 1 is received. At least one of the arbitration unit 204, the calculation unit 206, and the distribution unit 208 may set the upper limit value of the amount of change in the holding force, for example.

It should be noted that all or part of the modification described above may be combined as appropriate.

The embodiments disclosed herein should be considered as exemplary in all respects and not restrictive. The scope of the present disclosure is indicated by the claims rather than the description above, and is intended to include all modifications within the meaning and scope equivalent to the scope of the claims.

What is claimed is:

1. A vehicle control device comprising a processor configured to:
   receive a first requested value of acceleration acting on a vehicle from a first system configured to request holding a stopped state of the vehicle;
   receive a second requested value of the acceleration from a second system;
   select one of the first requested value and the second requested value as an arbitration result; and
   set a priority for selecting the first requested value lower than a priority for selecting the second requested value when the processor acquires predetermined information from one of the first system and the second system while the vehicle is stopped.

2. The vehicle control device according to claim 1, wherein the processor is configured to exclude the first requested value from a selection target when the processor acquires the predetermined information from one of the first system and the second system while the vehicle is stopped.

3. The vehicle control device according to claim 1, wherein the processor is configured to:
   calculate a holding force for holding the stopped state of the vehicle, using a requested value selected as the arbitration result; and
   acquire a requested acceleration calculated using the holding force as the first requested value when the first requested value is not input from the first system to the processor.

4. The vehicle control device according to claim 1, wherein the processor is configured to set an upper limit value of an amount of change in a holding force for holding the stopped state of the vehicle when the processor acquires the predetermined information.

5. A vehicle comprising:
   a first system configured to output a first requested value of acceleration acting on the vehicle and request holding a stopped state of the vehicle;
   a second system configured to output a second requested value of the acceleration acting on the vehicle; and
   a control device configured to
      control the vehicle using at least one of the first requested value and the second requested value,
      receive the first requested value,
      receive the second requested value,
      select one of the first requested value and the second requested value as an arbitration result, and
      set a priority for selecting the first requested value lower than a priority for selecting the second requested value when the control device acquires predetermined information from one of the first system and the second system while the vehicle is stopped.

6. A vehicle control method comprising:
   receiving a first requested value of acceleration acting on a vehicle from a first system configured to request holding a stopped state of the vehicle;
   receiving a second requested value of the acceleration from a second system;
   selecting one of the first requested value and the second requested value as an arbitration result; and
   setting a priority for selecting the first requested value lower than a priority for selecting the second requested value when predetermined information from one of the first system and the second system is acquired while the vehicle is stopped.

* * * * *